UNITED STATES PATENT OFFICE 2,626,272

ORGANOALKOXYSILANES

John L. Speier, Pittsburgh, Pa., assignor to Dow Corning Corporation, Midland, Mich., a corporation of Michigan No Drawing. Application July 26, 1950, Serial No. 176,072

6 Claims. (Cl. 260—448.8)

This invention relates to halogenated silicon esters and their derivatives.

It is an object of this invention to prepare organosilicon compounds which are useful in the preparation of organosilyl alcohols. Another object is to prepare compounds which may be employed in novel organic syntheses. Other objects and advantages will be apparent from the following description.

This invention relates to compounds of the formula $R_3SiO(CH_2)_xCl$ where R is selected from the group alkyl and phenyl, and $x$ has a value of 3 to 5.

The organosilicon esters of this invention are prepared by reacting a chlorosilane of the formula $R_3SiCl$ with a chloroalcohol of the formula $HO(CH_2)_xCl$. The reaction is best carried out in the presence of a hydrogen chloride acceptor such as ammonia, pyridine, and other organic amines. Better yields are obtained by reacting a disilazane of the formula $(R_3Si)_2NH$ with the chloroalcohols. This reaction proceeds according to the equation $(R_3Si)_2NH + 2HO(CH_2)_xCl \rightarrow$
$\qquad 2R_3SiO(CH_2)_xCl + NH_3$ This latter method is of particular advantage since no solid by-product is obtained. In both of the above methods reaction is preferably carried out at 30° C.

If desired, inert solvents such as benzene, hexane, or diethylether may be employed.

The chlorosilanes employed therein are those in which the R groups may be any alkyl radical or a phenyl radical. The chloroalcohols are those which contain at least three carbon atoms. The carbon chain may contain any number of atoms above three, however, because of commercial availability it is preferred that the chloroalcohol contains from 3 to 5 carbon atoms.

The products of this invention are of particular utility in the preparation of organosilylalcohols, as is more fully described in the applicant's copending application filed concurrently herewith. In general, the alcohols are prepared by reacting the chloroalkoxysilanes of this invention with sodium, lithium, or magnesium. In the case of sodium and lithium, a rearrangement takes place at room temperature according to the equation $R_3SiO(CH_2)_xCl + M \rightarrow R_3Si(CH_2)_xOM$. Thus, a metallic alkoxide is obtained rather than the expected organometallic compound of the type $R_3SiO(CH_2)_xM$. With magnesium, however, such a rearrangement does not take place at temperatures below 55° C. Hence, it is possible to prepare stable organomagnesium derivatives of the formula $R_3SiO(CH_2)_xMgCl$. It has been found unexpectedly that magnesium will not react with compounds of the formula $R_3SiO(CH_2)_3Cl$, but does form Grignard reagents with those compounds where $x$ is above 3, for example where $x$ is 4 or 5.

The organomagnesium compounds of the above type are stable at room temperature if stored under the usual conditions for keeping Grignard reagents. These organomagnesium compounds can be reacted with any organic compound which normally reacts with Grignard reagents. For example, the compounds will react with allyl halides, aldehydes, ketones, esters, nitro compounds, sulfones, acyl halides, and nitriles.

The resulting product is then hydrolyzed with water to remove the organosilyl group with the concurrent formation of an alcoholic hydroxyl. Since this hydrolysis will occur under the mildest of conditions, it is now possible to synthesize organic alcohols which heretofore were prepared with great difficulty or not at all.

Furthermore, the above method offers a simple means of increasing the chain length of organic compounds by 4 or 5 carbon atoms. With many organic compounds the only way heretofore known for increasing the length of a chain terminated by alcoholic hydroxyl was by methods which involve the step-wise addition of one to two carbon atoms at a time. It is now possible to add in one step a hydroxylated chain of from 4 to 5 carbon atoms to an organic compound containing functional groups.

Specific examples of the use of the instant organomagnesium compounds are as follows: $(CH_3)_3SiO(CH_2)_5MgCl$ is prepared by reacting 5-chloropentoxytrimethylsilane with magnesium in diethylether. The resulting Grignard reagent is then reacted with benzoyl chloride and the resulting product is hydrolyzed. The process may be represented by the equation $(CH_3)_3SiO(CH_2)_5MgCl + C_6H_5COCl \longrightarrow$
$\qquad (CH_3)_3SiO(CH_2)_5COC_6H_5 \xrightarrow{H_2O}$
$\qquad\qquad HO(CH_2)_5COC_6H_5 + [(CH_3)_3Si]_2O$ A similar synthesis can be carried out with acetone to give $HO(CH_2)_5C(CH_3)_2OH$. Many other applications for the products of this invention will be apparent to those skilled in the art.

The following examples are illustrative only and should not be considered as limiting the invention.

Example 1

440 g. of trimethylchlorosilane in an equal volume of benzene was mixed with 378 g. of 3-chloropropanol-1 and anhydrous ammonia was bubbled through the mixture until the odor of ammonia persisted. The ammonium chloride formed was removed by filtration and the product was distilled to give 513 g. of 3-chloropropoxy-1-trimethylsilane, boiling point 155° C. at 733 mm., $n_D^{25°C.}$ 1.4164, $d_4^{25°C.}$ .9371 and specific refraction .2680.

Example 2

A mixture of 340 g. of pyridine and 527 g. of ethyldimethylchlorosilane was added to 456 g. of 4-chlorobutanol-1 in 1 liter of benzene. After cooling, the mixture was filtered free of pyridine hydrochloride and distilled to yield 392 g. of 4-chlorobutoxy-1-ethyldimethylsilane, boiling point 94° C. at 24 mm., $n_D^{25°C.}$ 1.4295, $d_4^{25°C.}$ .927 and a specific refraction of .2785.

Example 3

91 g. of hexamethyldisilazane was added to 108 g. of 4-chlorobutanol-1 with external cooling. After the evolution of ammonia had ceased, the mixture was distilled to obtain 143 g. of 4-chlorobutoxy-1-trimethylsilane, boiling point 79° C. at 24 mm., $n_D^{25°C.}$ 1.4219, $d_4^{25°C.}$ .926 specific refraction .2745.

Example 4

201 g. of 5-chloropentanol-1 was mixed with 161 g. of hexamethyldisilazane under vacuum in a cooling bath. After 20 hours the product was distilled to yield 306 g. of 5-chloropentoxy-1-trimethylsilane, boiling point 96° C. at 25 mm., $n_D^{25°}$ C. 1.4261.

Example 5

When phenyldibutylchlorosilane is reacted with $HO(CH_2)_5Cl$ in an ammoniacal benzene solution, the compound $C_6H_5(C_4H_9)_2SiO(CH_2)_5Cl$ is obtained.

Example 6

103 g. of 5-chloropentanol-1 was dissolved in 300 ml. of benzene together with 110 g. of ethyldimethylchlorosilane. Pyridine was added to the solution in small portions until further addition caused no precipitation of solids. The mixture was filtered and distilled to yield 108 g. of 5-chloropentoxy-1-dimethylethylsilane, boiling point 110° C. at 21 mm., $n_D^{25°C.}$ 1.4337, $d_4^{25°C.}$ .927 and specific refraction .2807.

Example 7

116 g. of 4-chlorobutoxy-1-trimethylsilane was added slowly to 16.5 g. of magnesium chips in absolute ether. The usual precautions were taken to guard against moisture and oxygen. Reaction proceeded slowly and continued until the magnesium dissolved. The resulting product was $(CH_3)_3SiO(CH_2)_4MgCl$. The ether solution was refluxed for one hour and there was no evidence of decomposition of the product.

Example 8

114 g. of 5-chloropentoxy-1-trimethylsilane was added slowly to 16.5 g. of magnesium chips in absolute ether. During the reaction the usual precautions were taken to guard against moisture and oxygen. Reaction continued until the magnesium had dissolved and the resulting product was $(CH_3)_3SiO(CH_2)_5MgCl$. This material is stable in refluxing ether solution.

That which is claimed is:

1. A compound of the formula $R_3SiO(CH_2)_xCl$ where R is selected from the group consisting of alkyl and phenyl radicals and $x$ has a value from 3 to 5.
2. $(CH_3)_3SiO(CH_2)_3Cl$.
3. $(CH_3)_3SiO(CH_2)_4Cl$.
4. $(CH_3)_3SiO(CH_2)_5Cl$.
5. $C_2H_5(CH_3)_2SiO(CH_2)_4Cl$.
6. $C_2H_5(CH_3)_2SiO(CH_2)_5Cl$.

JOHN L. SPEIER.

REFERENCES CITED

The following references are of record in the file of this patent:

UNITED STATES PATENTS

| Number | Name | Date |
|---|---|---|
| 2,381,138 | Patnode | Aug. 7, 1945 |
| 2,438,520 | Robie | May 30, 1948 |

OTHER REFERENCES

Taurke: "Berichte der deut. Chem. Ges.," vol. 38 (1905), pages 1661–1670.